United States Patent
Katou

(10) Patent No.: US 9,039,187 B2
(45) Date of Patent: *May 26, 2015

(54) ILLUMINATION OPTICAL SYSTEM AND A PROJECTOR USING THE SAME

(75) Inventor: Atsushi Katou, Tokyo (JP)

(73) Assignee: NEC DISPLAY SOLUTIONS, LTD., Tokyo (JP)

(*) Notice: Subject to any disclaimer, the term of this patent is extended or adjusted under 35 U.S.C. 154(b) by 6 days.

This patent is subject to a terminal disclaimer.

(21) Appl. No.: 13/642,833

(22) PCT Filed: May 21, 2010

(86) PCT No.: PCT/JP2010/058613
§ 371 (c)(1),
(2), (4) Date: Oct. 22, 2012

(87) PCT Pub. No.: WO2011/145207
PCT Pub. Date: Nov. 24, 2011

(65) Prior Publication Data
US 2013/0038847 A1     Feb. 14, 2013

(51) Int. Cl.
*G03B 21/00* (2006.01)
*G03B 21/14* (2006.01)
(Continued)

(52) U.S. Cl.
CPC ............... *G03B 21/14* (2013.01); *G02B 5/26* (2013.01); *G03B 21/204* (2013.01); *H04N 9/3114* (2013.01); *H04N 9/3161* (2013.01); *G02B 2207/113* (2013.01)

(58) Field of Classification Search
CPC .. G02B 27/145; G02B 27/149; G02B 27/283; G02B 27/1046; H04N 9/3197

USPC ........... 353/30, 31, 33, 37, 84, 85, 88, 97, 98, 353/99; 362/84, 217.08, 227, 260; 349/5, 349/7–9

See application file for complete search history.

(56) References Cited

U.S. PATENT DOCUMENTS 6,644,814 B2    11/2003    Ogawa et al.
6,788,354 B2 *   9/2004    Russ et al. ..................... 348/745
(Continued)

FOREIGN PATENT DOCUMENTS

CN    1448778 A    10/2003
CN    1734347 A    2/2006
(Continued)

OTHER PUBLICATIONS

International Search Report (ISR) (PCT Form PCT/ISA/210) dated Jun. 22, 2010, in PCT/JP2010/058613.
(Continued)

*Primary Examiner* — Sultan Chowdhury
(74) *Attorney, Agent, or Firm* — McGinn IP Law Group, PLLC

(57) ABSTRACT

The present invention seeks to realize a small etendu illumination optical system, a longer operating life and a higher brightness. The illumination optical system comprises: a laser light source that generates an excitation light; a fluorescent substance that generates a fluorescent light in response to the excitation light, a light tunnel that outputs the excitation light input at one end thereof to the fluorescent substance from the other end thereof, and that outputs the fluorescent light generated by the fluorescent substance from the one end thereof; and a mirror that is placed within a light path between the laser light source and the light tunnel, and that reflects the fluorescent light, the mirror having an aperture formed thereon that allows the excitation light to pass through.

8 Claims, 6 Drawing Sheets

(51) Int. Cl.
 *G02B 5/26* (2006.01)
 *G03B 21/20* (2006.01)
 *H04N 9/31* (2006.01)

(56) References Cited

U.S. PATENT DOCUMENTS

| | | | |
|---|---|---|---|
| 8,616,708 B2 * | 12/2013 | Masuda | 353/84 |
| 2004/0021831 A1 * | 2/2004 | Koide | 353/31 |
| 2009/0284148 A1 | 11/2009 | Iwanaga | |
| 2014/0125956 A1 * | 5/2014 | Chifu et al. | 353/31 |

FOREIGN PATENT DOCUMENTS

| | | |
|---|---|---|
| CN | 1890984 A | 1/2007 |
| CN | 201097088 Y | 8/2008 |
| CN | 201104278 Y | 8/2008 |
| CN | 201134006 Y | 10/2008 |
| CN | 101581410 A | 11/2009 |
| CN | 101836160 A | 9/2010 |
| CN | 102741743 A | 10/2012 |
| JP | 2003-186110 A | 7/2003 |
| JP | 2004-341105 A | 12/2004 |
| JP | 2008-52070 A | 3/2008 |
| JP | 2009-277516 A | 11/2009 |
| TW | 200604466 A | 2/2006 |

OTHER PUBLICATIONS

Chinese Office Action dated Aug. 4, 2014 with English Translation.
Chinese Office Action dated Mar. 12, 2015 with English Translation.

* cited by examiner

ILLUMINATION OPTICAL SYSTEM AND A PROJECTOR USING THE SAME

TECHNICAL FIELD

The present invention relates to an illumination optical system for generating illumination lights of plural colors to form image lights of plural colors, and to a projector for projecting the image lights that are provided by the illumination optical system.

BACKGROUND ART

Attention has been focused on the technology of utilizing LEDs (Light Emitting Diodes) as a light source of a projector for projecting images onto a screen, such as a liquid-crystal projector and a DMD (Digital Micromirror Device) projector (see Patent Document 1).

Projectors, which have LEDs as a light source, offer the advantage of a longer operating life and a higher reliability due to a longer operating life and a higher reliability of LEDs.

However, since lights from LEDs have low brightness as lights for projectors, it is not easy to obtain images with ample brightness in projectors having LEDs as a light source. The amount of lights from the light source that can be utilized by a display panel as a projection light, is limited by the etendue. Specifically, if the product of the light-emitting area and a radiation angle of the light source is not made equal to or smaller than the product of the area of an incidence plane of the display panel and an incident angle that is determined by a F number of an illumination optical system, then the light from the light source can not be efficiently utilized as a projection light.

For a light source using LEDs, if the light-emitting area is increased, the amount of light can be increased, but the etendues of the light source becomes larger. From the limitation of etendues, for a light source of a projector, it is desired to increase the amount of light without increasing the light-emitting area. However, for a light source using LEDs, it is difficult to increase the amount of light without increasing the light-emitting area.

PRIOR ART DOCUMENTS

Patent Documents

Patent Document 1: JP2003-186110A

SUMMARY OF INVENTION

Problem to be Solved by the Invention

A light source using LEDs alone has the drawback of large etendues. The present invention seeks to realize an illumination optical system that has small etendues, a longer operating life and a higher brightness.

Means to Solve the Problems

An illumination optical system according to the present invention comprises: a laser light source that generates an excitation light; a fluorescent substance that generates a fluorescent light in response to the excitation light; a light tunnel that outputs the excitation light input at one end thereof to the fluorescent substance from the other end thereof, and that outputs the fluorescent light generated by the fluorescent substance from the one end thereof; and a mirror that is placed within a light path between the laser light source and the light tunnel, and that reflects the fluorescent light, the mirror having an aperture formed thereon that allows the excitation light to pass through.

In addition, a projector according to the present invention comprises the above-described illumination optical system.

Effects of the Invention

The present invention is capable of realizing a small etendue illumination optical system, a longer operating life and a higher brightness, because a laser having a high energy density is concentrated as an excitation light on a fluorescent substance, and a fluorescent light is used that is emitted from the location where the laser is concentrated.

BRIEF EXPLANATIONS OF THE DRAWINGS

Figure 3A:
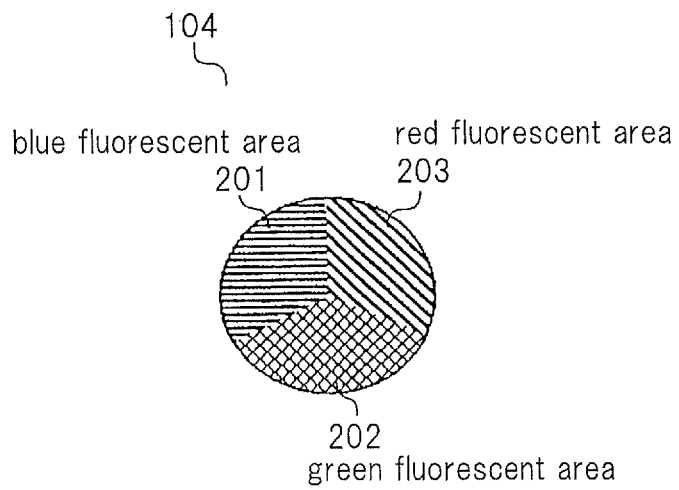
FIG. 3A is a plan view of fluorescent wheel 104 when it is seen from the side of the incidence plane of the laser light generated by laser light source 101.
Figure 3B:
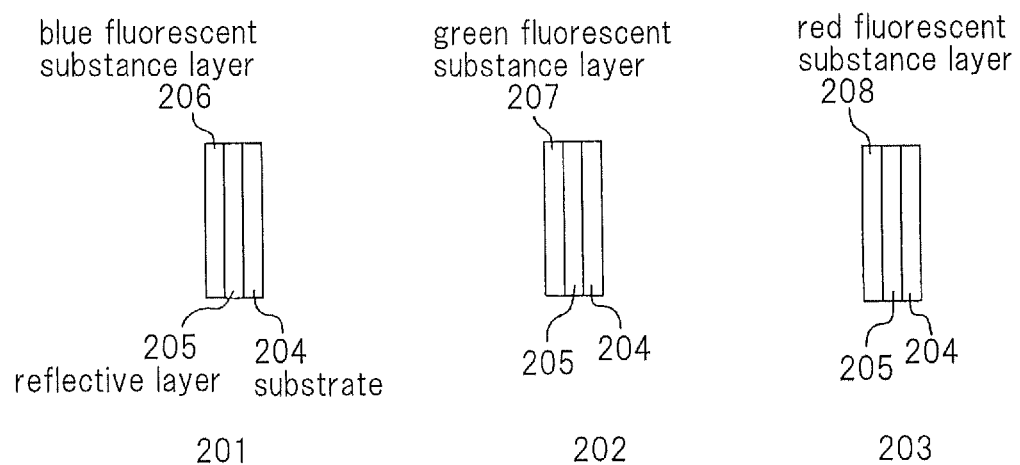

FIG. 3B is a cross-sectional view illustrating the configurations of blue fluorescent area 201, green fluorescent area 202 and red fluorescent area 203.

Figure 4:
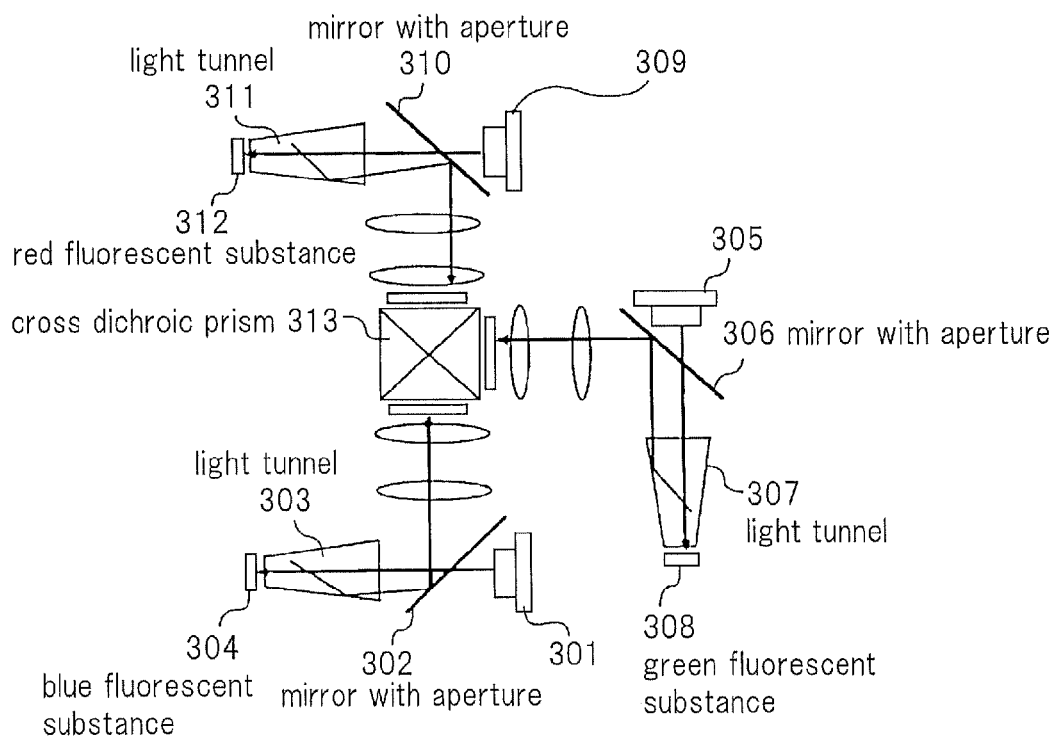

FIG. 4 is a block diagram illustrating the configuration of an illumination optical system according to another exemplary embodiment of the present invention.

Figure 5A:
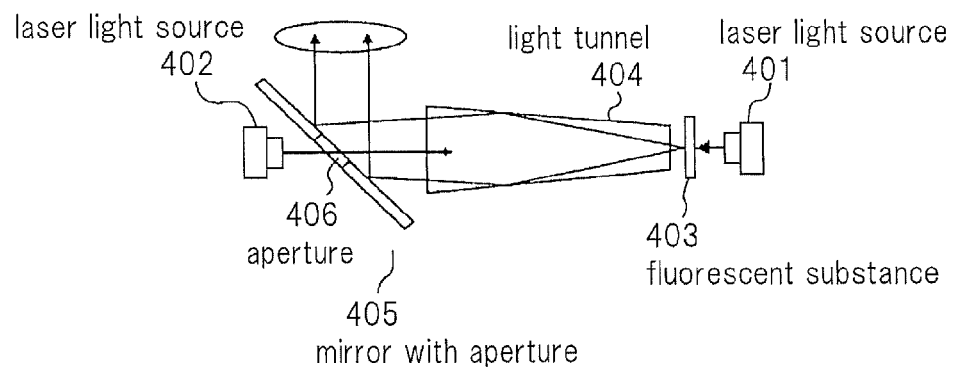

FIG. 5A is a block diagram illustrating the configuration of an illumination optical system according to yet another exemplary embodiment of the present invention.

Figure 5B:
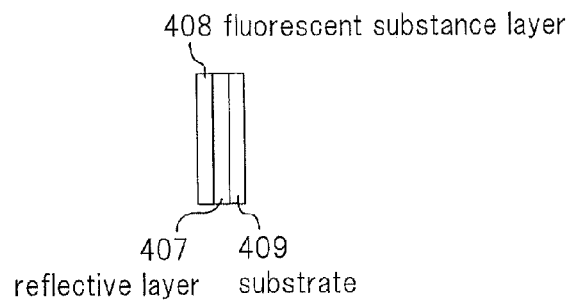

FIG. 5B is a cross-sectional view of fluorescent substance 403 illustrating the configuration thereof.

Figure 1:
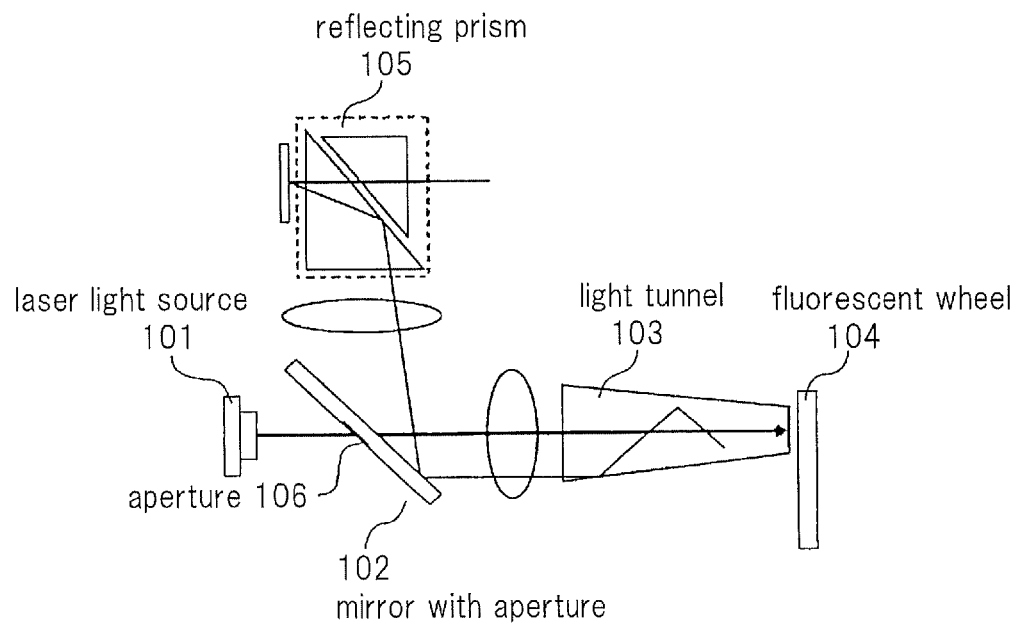
FIG. 1 is a block diagram illustrating the configuration of an illumination optical system according to an exemplary embodiment of the present invention.
Figure 6:
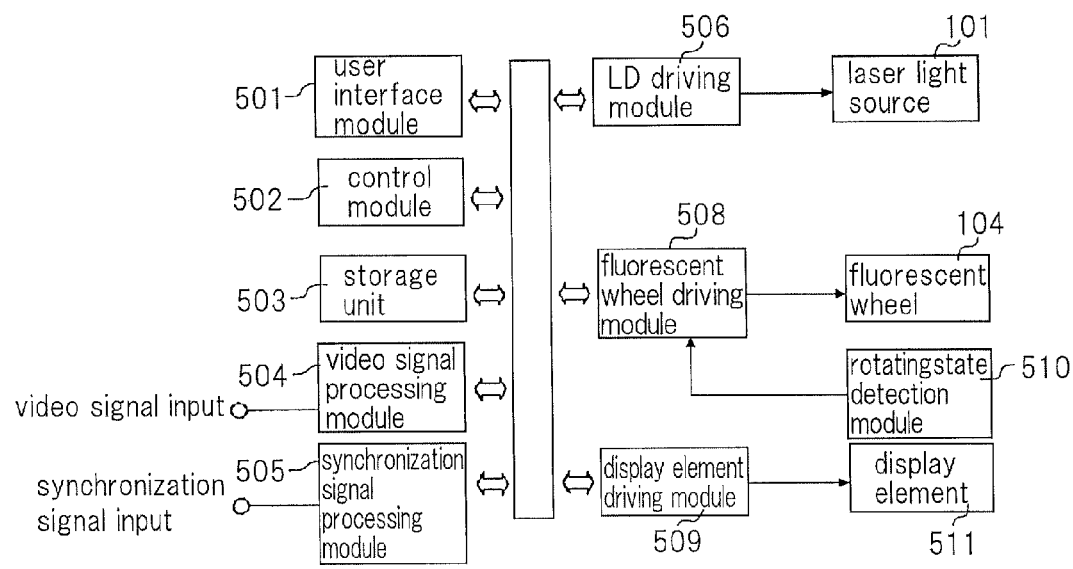

FIG. 6 is a block diagram illustrating the configuration of the circuitry of a projector that uses the illumination optical system of the exemplary embodiment shown in FIG. 1.

Figure 7:
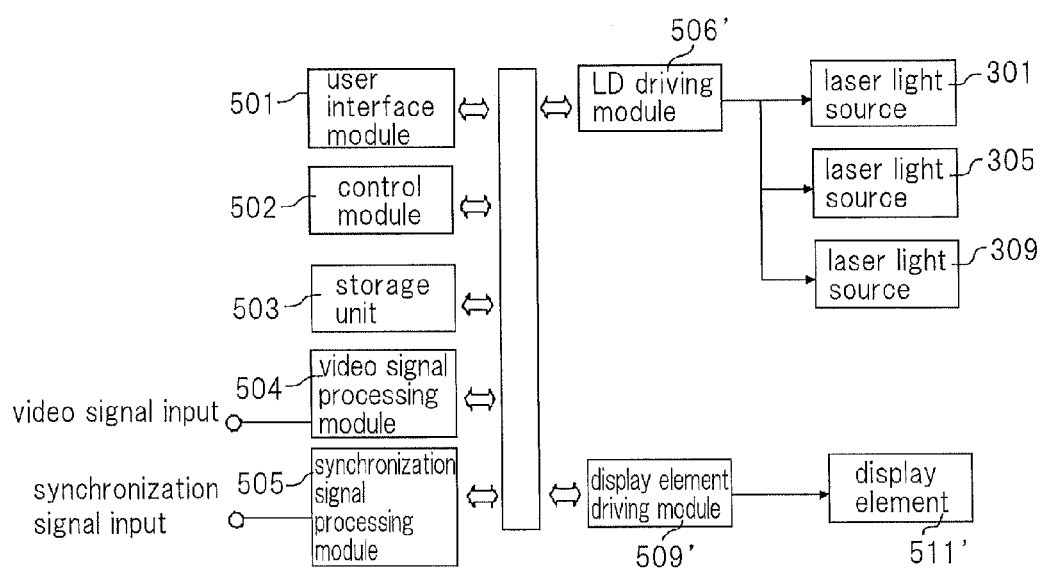

FIG. 7 is a block diagram illustrating the configuration of the circuitry of a projector that uses the illumination optical system of the exemplary embodiment shown in FIG. 4.

MODES FOR CARRYING OUT THE INVENTION

Exemplary embodiments of the present invention will be described hereinafter with reference to the drawings.

FIG. 1 is a block diagram illustrating the configuration of an illumination optical system according to an exemplary embodiment of the present invention.

As shown in FIG. 1, the illumination optical system of the exemplary embodiment comprises laser light source 101, mirror with aperture 102, light tunnel 103, fluorescent wheel 104 and reflecting prism 15. Mirror with aperture 102 has aperture 106 on which no reflective area is formed.

Laser light source 101 generates a laser light used as an excitation light with a wavelength of λ1. The laser light that is generated by laser light source 101, passes through aperture 106 of mirror with aperture 102 and light tunnel 103, and enters fluorescent wheel 104.

Mirror with aperture 102 is located within a light path between laser light source 101 and light tunnel 103.

Figure 2A:
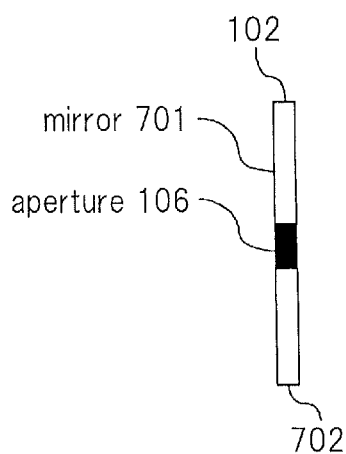
FIG. 2A is a cross-sectional view of mirror with aperture 102.
Figure 2B:
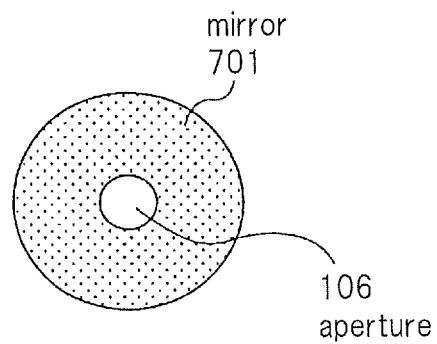
FIG. 2B is an elevation view of mirror with aperture 102.

FIG. 2A is a cross-sectional view of mirror with aperture 102, and FIG. 2B is an elevation view of mirror with aperture 102.

As shown in FIGS. 2A and 2B, mirror with aperture 102 comprises mirror 701 that reflects the fluorescent light that is generated by fluorescent wheel 104 and that is output through light tunnel 103, and aperture 106 that allows the laser light to pass through and outputs the laser light towards fluorescent wheel 104 through light tunnel 103.

Mirror 701 is formed by, for example, evaporating aluminum, chrome, etc. on transparent substrate 702 such as a flat glass. Aperture 106 is formed by, for example, providing a non-evaporation section on substrate 702, or by providing a through hole on transparent substrate 702. In short, aperture 106 needs only to be formed such that it passes through the laser light (the excitation light).

The shape of substrate 702 is not limited to be circular shown in FIGS. 2A and 2B, but may be rectangular and any other shape. The shape of aperture 106 is also not limited to be circular.

Figure 2C:
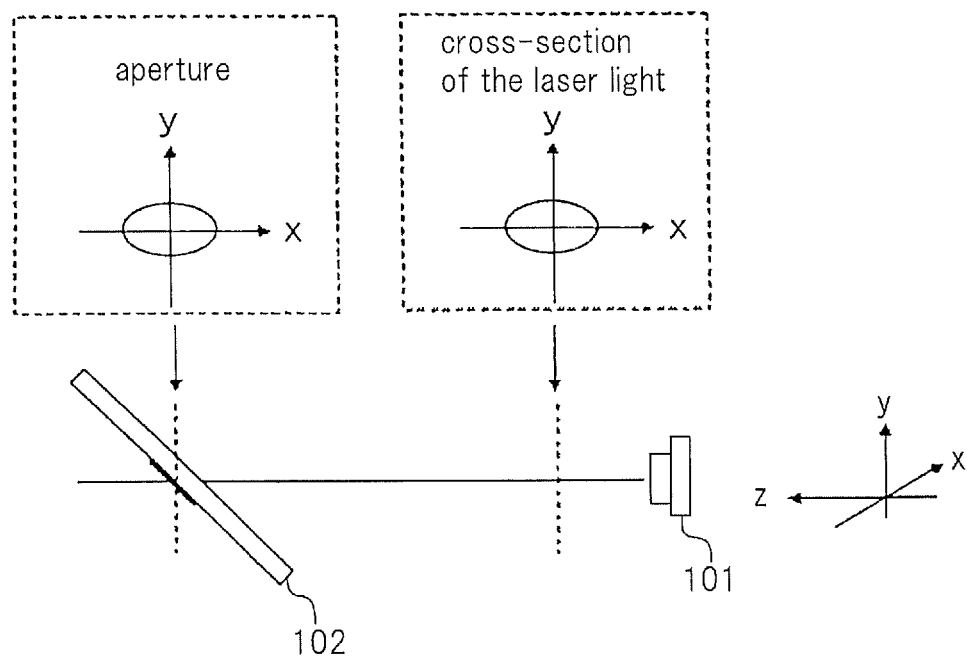
FIG. 2C is a view illustrating an example of the placement of mirror with aperture 102.

Additionally, as shown in FIG. 2C, mirror with aperture 102 may preferably be arranged at an angle with respect to the direction in which laser light travel.

In general, in many cases, the cross-sectional shape of the light emitted from a semiconductor laser is not circular, but ellipsoidal. Accordingly, when aperture 106 is circular in shape, for example, the shape of aperture 106 is ellipsoidal when it is seen from the z direction in FIG. 2C. Therefore, if the orientation of the long axis of the cross-section of the laser light is matched to the orientation of the long axis of aperture 106, then the laser light can efficiently pass through aperture 106.

Fluorescent wheel 104 has a plurality of fluorescence generation areas that generate lights with differing wavelengths in response to the laser light generated by laser light source 101.

FIG. 3A is a plan view of fluorescent wheel 104 when it is seen from the side of the incidence plane of the laser light generated by laser light source 101, i.e., when fluorescent wheel 104 is seen from the left-hand side in FIG. 1.

Fluorescent wheel 104 is circular in shape, and has three areas defined by their center angles: blue fluorescent area 201, green fluorescent area 202 and red fluorescent area 203. Blue fluorescent area 201, green fluorescent area 202 and red fluorescent area 203 generate, when the laser light generated by laser light source 101 enters the respective areas, blue fluorescent light, green fluorescent light and red fluorescent light, respectively. The blue fluorescent light, green fluorescent light and red fluorescent have respective wavelengths of λ2, λ3 and λ4, wherein λ2<λ3<λ4 and λ1 is the wavelength of the laser light.

FIG. 3B is a cross-sectional view illustrating the configurations of blue fluorescent area 201, green fluorescent area 202 and red fluorescent area 203.

In blue fluorescent area 201 shown in FIG. 3B, reflective layer 205 and blue fluorescent substance layer 206 are laminated on substrate 204. Reflective layer 205 reflects a light with wavelengths of λ2 to λ4. Blue fluorescent substance layer 206 generates a blue fluorescent light with a wavelength of λ2 when the laser light for excitation with a wavelength of λ1 enters the layer.

In green fluorescent area 202 shown in FIG. 3B, green fluorescent substance layer 207 is laminated on reflective layer 205. Green fluorescent substance layer 207 generates a green fluorescent light with a wavelength of λ3 when the laser light for excitation with a wavelength of λ1 enters the layer.

In red fluorescent area 203 shown in FIG. 3B, red fluorescent substance layer 207 is laminated on reflective layer 205. Red fluorescent substance layer 207 generates a red fluorescent light with a wavelength of λ4 when the laser light for excitation with a wavelength of λ1 enters the layer.

Fluorescent wheel 104 configured above rotates about its central axis whereby the laser light irradiated from light tunnel 103 moves on the respective fluorescent areas. The laser light generated by laser light source 101 enters near the periphery of fluorescent wheel 104. Therefore, in a state in which the laser light generated by laser light source 101 is entering fluorescent wheel 104, blue fluorescent light, green fluorescent light and the red fluorescent light are sequentially generated, and are reflected by reflective layer 205 to re-enter light tunnel 103.

In the present exemplary embodiment, lights with four wavelengths (λ1~λ4) having the relationship λ1<λ2<λ3<λ4 are used. Mirror with aperture 102 reflects a large portion of lights with the wavelength of λ2, λ3 and λ4, and light with a wavelength of λ1 passes through aperture 106. Light tunnel 103 is tapered such that both the end faces thereof, which serve as the entrance face and as the exist face, respectively, have different sizes. This changes the angular distributions of fluorescent lights that are generated and diffused by each fluorescent substance to make the distribution of the fluorescent lights uniform. The light tunnel described herein includes: one that is hollow and has an inner wall constituted by a mirror; and one that is solid and is formed by transparent polygonal columns to utilize total reflection. The latter is also called a rod lens.

In the present exemplary embodiment, the laser light that is generated by laser light source 101, passes through aperture 106 of mirror with aperture 102, enters light tunnel 103 at one end thereof, passes through light tunnel 103, and exits light tunnel 103 at the other end thereof towards fluorescent wheel 104. The blue fluorescent light, green fluorescent light and red fluorescent light that are sequentially generated by fluorescent wheel 104 re-enter light tunnel 103 and exit light tunnel 103 at the one end thereof, a large portion of which is reflected by mirror 701 of mirror with aperture 102. Thereafter, the fluorescent light that has reflected by mirror 701 is reflected by reflecting prism 105 and is radiated as an illumination light.

Here, the reason why a large portion of each fluorescent light is reflected by mirror 701 is that since the laser light is a beam-like light with a very small spread, and since aperture 106 of mirror 102 also has a small area which is dependent on the cross-sectional area of the beam, large portions of lights with wavelengths of λ2, λ3 and λ4 do not enter aperture 106.

As discussed hereinabove, in the illumination optical system according to the present exemplary embodiment, uniformed red fluorescent light, green fluorescent light and blue fluorescent light appear in order, and are used as an illumination light.

FIG. 4 is a block diagram illustrating the configuration of an illumination optical system according to another exemplary embodiment of the present invention.

In the exemplary embodiment shown in FIG. 1, use is made of the fluorescent wheel having three fluorescent areas to generate fluorescent lights of three colors from one excitation light source. By contrast, in the present exemplary embodiment, excitation light sources are provided, each being associated with a fluorescent substance of each color.

As shown in FIG. 4A, the illumination optical system according to the present exemplary embodiment comprises laser light sources 301, 305, 309, mirrors with aperture 302, 306, 310, light tunnels 303, 307, 311, blue fluorescent substance 304, green fluorescent substance 308, red fluorescent substance 312 and cross dichroic prism 313.

Laser light sources 301, 305 and 309 generate laser lights used as an excitation light with a wavelength of $\lambda 1$. Blue fluorescent substance 304, green fluorescent substance 308 and red fluorescent substance 312 generate a blue fluorescent light, a green fluorescent light and a red fluorescent light, respectively, when the laser light generated by laser light source 301 enters the respective areas. The blue fluorescent light, green fluorescent and red fluorescent have respective wave lengths $\lambda 2$, $\lambda 3$ and $\lambda 4$, wherein $\lambda 1 < \lambda 2 < \lambda 3 < \lambda 4$.

Blue fluorescent substance 304, green fluorescent substance 308 and red fluorescent substance 312 have configurations similar to blue fluorescent area 201, green fluorescent area 202 and red fluorescent area 203 shown in FIG. 3B, in which the blue fluorescent substance, the green fluorescent substance and the red fluorescent substance are formed on the reflective layers formed on the substrate.

Mirror with aperture 302 allows the light with the wavelength of $\lambda 1$ to pass through, but reflects a large portion of the light with a wavelength of $\lambda 2$. Mirror with aperture 306 allows the light with a wavelength of $\lambda 1$ to pass through, but reflects a large portion of the light with a wavelength of $\lambda 3$. Mirror with aperture 310 allows the light with a wavelength of $\lambda 1$ to pass through, but reflects a large portion of the light with a wavelength of $\lambda 4$.

Similar to light tunnel 103 shown in FIG. 1, light tunnels 303, 307 and 311 are tapered such that both end faces thereof, which serve as the entrance face and the exist face, respectively, have different sizes. This changes the angular distributions of fluorescent lights that are generated and diffused by each fluorescent substance to make the distributions of the fluorescent lights uniform. The light tunnel described herein includes one that is hollow and has an inner wall that is constituted by a mirror; and one that is solid and is formed by transparent polygonal columns to utilize total reflection.

The laser light generated by laser light source 301 passes through mirror with aperture 302 and light tunnel 303, and enters blue fluorescent substance 304. The blue fluorescent light generated by blue fluorescent substance 304 passes through light tunnel 303, and a large portion of the blue fluorescent light is reflected by mirror with aperture 302, and enters cross dichroic prism 313.

The laser light generated by laser light source 305 passes through mirror with aperture 306 and light tunnel 307, and enters green fluorescent substance 308. The green fluorescent light generated by green fluorescent substance 308 passes through light tunnel 307, and a large portion of the green fluorescent light is reflected by mirror with aperture 306, and enters cross dichroic prism 313.

The laser light generated by laser light source 309 passes through mirror with aperture 310 and light tunnel 311, and enters red fluorescent substance 312. The red fluorescent light generated by red fluorescent substance 312 passes through light tunnel 311, and a large portion of the red fluorescent light is reflected by minor with aperture 310, and enters cross dichroic prism 313.

Cross dichroic prism 313 allows light with a wavelength of $\lambda 3$ to pass through, but reflects lights with wavelengths of $\lambda 2$ and $\lambda 4$. This allows the fluorescent lights generated by the respective fluorescent substances to be emitted in the same direction.

In the present exemplary embodiment configured above, it is possible to generate a plurality of fluorescent lights simultaneously because a unit for generating a fluorescent light is provided for each color. Further, by driving laser light sources 301, 305 and 309 in order, the fluorescent lights can be sequentially output, similar to the illumination optical system shown in FIG. 1.

FIG. 5A is a block diagram illustrating the configuration of an illumination optical system according to yet another exemplary embodiment of the present invention.

The present exemplary embodiment is a modification of, among the units each associated with each color in the embodiment shown in FIG. 3, a unit in which an excitation light generated by the laser light source passes through the mirror with aperture and enters the light tunnel. This modification is intended to increase light output.

As shown in FIG. 5A, the illumination optical system of the present exemplary embodiment comprises laser light sources 401, 402, fluorescent substance 403, light tunnel 404 and mirror with aperture 405. Laser light sources 401 and 402 generate laser lights with the same wavelength, as an excitation light. Laser light source 401 is a second laser light source that irradiates the excitation light towards fluorescent substance 403 from the side of fluorescent substance 403 opposite to light tunnel 404.

FIG. 5B is a cross-sectional view of fluorescent substance 403 illustrating the configuration thereof. As shown, fluorescent substance 403 has a configuration in which reflective layer 407 and fluorescent substance layer 408 are laminated on substrate 409. Fluorescent substance layer 408 generates a fluorescent light having a wavelength larger than those of the laser lights generated by laser light sources 401 and 402 in response to the laser lights. Reflective layer 407 allows the laser lights generated by laser light sources 401 and 402 to pass through, but reflects the fluorescent light generated by fluorescent substance layer 408.

Mirror with aperture 405 allows the laser light generated by laser light source 401 to pass through, but reflects the fluorescent light generated by fluorescent substance layer 408.

The laser light generated by laser light source 401 passes through reflective layer 407, and enters fluorescent substance layer 408. The laser light generated by laser light source 402 passes through mirror with aperture 405, and enters fluorescent substance layer 408. Fluorescent substance layer 408 generates a fluorescent light due to the entered laser lights from laser light sources 401 and 402. The fluorescent light generated by fluorescent substance layer 408 passes through light tunnel 404, is reflected by mirror with aperture 405, and is output outwards for use as an illumination light.

The fluorescent wheel shown in FIG. 1 may be used in place of fluorescent substance 403 in the present exemplary embodiment to form an illumination optical system which sequentially outputs fluorescent lights of respective colors. The unit in the present exemplary embodiment may be converted into three separate units that generate differing fluorescent lights to form the illumination optical system shown in FIG. 3.

FIG. 6 is a block diagram illustrating the configuration of the circuitry of a projector that uses the illumination optical system of the exemplary embodiment shown in FIG. 1.

The projector shown in FIG. 6 comprises user interface module 501, control module 502, storage unit 503, video signal processing module 504, synchronization signal processing module 505, LD driving module 506, fluorescent wheel driving module 508, display element driving module 509, rotating state detection module 510, display element 511, laser light source 101 shown in FIG. 1 and fluorescent wheel 104 shown in FIG. 1.

User interface module 501 receives an instruction input from a user and outputs the same to control module 502. User interface module 501 also displays the current operation state of the projector on a display unit (not shown) such as an indicator, a display panel, etc.

Control module 502 controls each module that constitutes the projector in accordance with a program stored in storage unit 503.

Storage unit 503 stores a control program of control module 502, and also stores video data temporally.

Video signal processing module 504 converts a video signal that is input from the outside into a video signal used in the projector. As explained above, since the present exemplary embodiment is configured such that illumination lights of respective colors are sequentially output from the illumination optical system, video signals depending on the respective colors are sequentially generated.

Synchronization signal processing module 505 converts a synchronization signal synchronized with a video signal that is input from the outside into a video signal used in the projector. Specifically, synchronization signal processing module 505 generates and outputs a synchronization signal indicates times for outputting video signals of respective colors.

LD driving module 506 controls the lighting state of laser light source 101 depending on the synchronization signal that is output by synchronization signal processing module 505.

Rotating state detection module 510 detects the rotating state of fluorescent wheel 104, and outputs the result to fluorescent wheel driving module 508.

Fluorescent wheel driving module 508 controls the rotating state of fluorescent wheel 104 such that the color of a video signal indicated in the synchronization signal that is output by synchronization signal processing module 505 matches the color that is output by the illumination optical system, and is indicated by the rotating state of fluorescent wheel 104 that is detected by rotating state detection module 510.

Display element driving module 509 drives display element 511 depending on the video signal that is output by the video signal processing module. Here, as display element 511, use is made of a reflective-type image-forming element in which a plurality of micro mirrors are arranged in a matrix form and an image is formed due to the reflection state of each micro mirror, and a display element that sequentially displays images of respective colors, such as a transmissive liquid crystal display element, a reflective liquid crystal display element, etc.

In the projector configured above, display element 511 is illuminated which displays an image corresponding to the respective colors based on the illumination lights of the respective colors that are sequentially output from the illumination optical system, and the reflected images or the transmissive images of display element 511 are sequentially projected through the illumination optical system (not shown).

FIG. 7 is a block diagram illustrating the configuration of a circuitry of the projector that uses the illumination optical system of the exemplary embodiment shown in FIG. 4.

The projector shown in FIG. 7 comprises user interface module 501, control module 502, storage unit 503, video signal processing module 504, synchronization signal processing module 505, LD driving module 506', display element driving module 509', display element 511 and laser light sources 301, 305 and 309 shown in FIG. 4.

The configurations and operations of user interface module 501, control module 502, storage unit 503, video signal processing module 504, synchronization signal processing module 505 are similar to those shown in FIG. 6, and their explanations are omitted by denoting them by identical reference numerals in FIG. 6.

LD driving module 506' controls the lighting state of laser light sources 301, 305 and 309 depending on the synchronization signal that is output by synchronization signal processing module 505.

Display element driving module 509' drives display element 511' depending on a video signal that is output by the video signal processing module. Here, similar to display element 511 shown in FIG. 6, as display element 511', use is made of a reflective-type image-forming element in which a plurality of micro mirrors are arranged in a matrix form and an image is formed due to the reflection state of each micro mirror, and a display element that sequentially displays images of respective colors, such as a transmissive liquid crystal display element, a reflective liquid crystal display element, etc. LD driving module 506' thus energizes laser light sources 301, 305 and 203 in accordance with the color of an image that is displayed by display element 511'.

The transmissive liquid crystal display element and the reflective liquid crystal display element can include ones that display color images. When a display element that performs color display is used as display element 511', LD driving module 506' energizes laser light sources 301, 305 and 309 simultaneously.

In the projector configured above, display element 511' is illuminated which displays an image corresponding to the respective colors based on the illumination lights of the respective colors that are output sequentially from the illumination optical system, and reflective images or transmissive images of display element 511' are sequentially projected through the illumination optical system (not shown).

The configurations illustrated in the figures in the above-described embodiments are given by way of example only, and the present invention should not be limited thereto.

EXPLANATIONS OF REFERENCE CHARACTERS 101 laser light source
102 mirror with aperture
103 light tunnel
104 fluorescent wheel
105 reflecting prism

What is claimed is:

1. An illumination optical system comprising: a laser light source that generates an excitation light; a fluorescent substance that generates a fluorescent light in response to the excitation light; a light tunnel that outputs the excitation light input at one end thereof to said fluorescent substance from the other end thereof, and that outputs the fluorescent light generated by said fluorescent substance from the one end thereof; and a mirror that is placed within a light path between said laser light source and said light tunnel, and that reflects the fluorescent light, said mirror having an aperture formed thereon that allows the excitation light to pass through, the fluorescent light being reflected by a part of the mirror which is different than the aperture; wherein the part of the mirror which is different from the aperture prevents the excitation light from passing therethrough.

2. The illumination optical system according to claim 1, wherein said fluorescent substance comprises a fluorescent wheel that has a plurality of fluorescent areas that generate fluorescent lights with differing wavelengths, said fluorescent wheel being rotated whereby the position on said fluorescent wheel that is irradiated by said light tunnel moves on the respective fluorescent areas.

3. An illumination optical system comprising a plurality of units, each constituted by said illumination optical system according to claim 1, wherein said fluorescent substance in each unit generates a fluorescent light with a differing wavelength, and wherein each unit further comprises a cross dichroic prism that inputs the output light from the unit and outputs the output light in the same direction.

4. The illumination optical system according to claim 1 further comprising a second light source that emits an excitation light towards said fluorescent substance from the side of fluorescent substance opposite to said light tunnel, wherein said fluorescent substance comprises a reflective layer that is located at the side of said second light source, allows the excitation light to pass through, but reflects the fluorescent light; and a fluorescent substance layer that is located at the side of said light tunnel.

5. A projector having the illumination optical system according claim 1.

6. The illumination optical system according to claim 1, wherein the excitation light passes through the mirror only at the aperture of the mirror.

7. The illumination optical system according to claim 1, wherein the excitation light passes through the aperture of the mirror such that the excitation light is not incident on the mirror.

8. The illumination optical system according to claim 1, wherein the excitation light passes through the mirror only at the aperture of the mirror, and wherein the excitation light passes through the aperture of the mirror such that the excitation light does not hit the mirror.

* * * * *